(12) United States Patent
Glabe et al.

(10) Patent No.: US 6,329,003 B1
(45) Date of Patent: Dec. 11, 2001

(54) CHICKEN MEAT PRODUCT AND METHOD OF MAKING

(76) Inventors: Elmer F. Glabe, 1354 Westwood Ct., Northbrook, IL (US) 60062; Victor H. Shubert, 3846 State Rte. 153, Washington County, Coulterville, IL (US) 62237

( * ) Notice: Subject to any disclaimer, the term of this patent is extended or adjusted under 35 U.S.C. 154(b) by 0 days.

(21) Appl. No.: 09/582,970

(22) PCT Filed: Apr. 30, 1999

(86) PCT No.: PCT/US99/09461

§ 371 Date: Jul. 7, 2000

§ 102(e) Date: Jul. 7, 2000

(87) PCT Pub. No.: WO99/55167

PCT Pub. Date: Nov. 4, 1999

Related U.S. Application Data

(60) Provisional application No. 60/083,660, filed on Apr. 30, 1998.

(51) Int. Cl.[7] ........................................................ A23L 1/315
(52) U.S. Cl. ........................... 426/92; 426/324; 426/326; 426/332; 426/644
(58) Field of Search .............................. 426/92, 324, 326, 426/332, 644

(56) References Cited

U.S. PATENT DOCUMENTS

| 3,025,170 | 3/1962 | Murphy et al. . |
| 3,065,084 | 11/1962 | Melnick et al. . |

FOREIGN PATENT DOCUMENTS

| 0312519 | 4/1989 | (EP) . |
| WO9003118 | 4/1990 | (WO) . |

*Primary Examiner*—Arthur L. Corbin
(74) *Attorney, Agent, or Firm*—Michael R. McKenna

(57) ABSTRACT

A chicken meat product rendered substantially free of pathogenic bacterial species by having an external coating of sodium diacetate substantially free of an adhesive material. The wet coating is retained on the external surfaces of the dressed chicken meat by the surface tension of the sodium diacetate solution after the chicken meat is coated with the solution and is hung freely to permit excess liquid to drain away. The amount of sodium diacetate present in the product of the invention depends upon the degree of pathogenic bacterial contamination of the chicken meat. The sodium diacetate is included in each case in sufficient quantity to preserve the meat from growth of all pathogenic bacteria of the order and species of salmonella, *E. coli,* and campylobacter.

13 Claims, No Drawings

CHICKEN MEAT PRODUCT AND METHOD OF MAKING

This application is based on applicant's provisional application Ser. No. 60/083,660 filed Apr. 30, 1998.

FIELD OF INVENTION

This invention relates to a packaged chicken meat product—either a dressed whole chicken or dressed chicken parts—that is coated with a water solution of sodium diacetate, or solid sodium diacetate in a specified form, to combat and eliminate certain pathogenic bacteria, and to the process of making such a product.

BACKGROUND OF INVENTION

Chicken production and processing for meat is a large and growing U.S. industry. Profit for processors, however, is not more than a few cents per pound of dressed chicken. The intense competition often leads to hazardous cost cutting that is contrary to good processing practices as prescribed by government oversight agencies such as the Food and Drug Administration, the U.S. Department of Agriculture and the Food Safety Inspection Service.

Salmonella, *E. coli,* and campylobacter have been clearly identified by many studies made by these government agencies, and by meat processors, as species of pathogenic bacteria that have often been found in chicken meat and have been the cause of food poisoning outbreaks that have affected large numbers of the population, often with many fatalities.

For example, a very significant finding by the Center for Disease Control and Prevention, Atlanta, Ga. reports that "illness caused by chickens rose threefold between 1988 and 1992." And as reported in the Feb. 8, 1998 issue of Consumer Reports, "salmonella and campylobacter cause 1.1 to 7 million food-borne infections and 2000 deaths per year." Further, as reported in The New York Times of Jan. 5, 1998:

> "The [current poultry pathogen hunt carried out by the U.S.D.A.] comes at a time when poultry risks are gaining much media attention. The New York Times and television's Cable News Network in October reported that 'Campylobacter . . . infects from 70% to 90% of all U.S. chickens. The reports state that the bacteria causes 2 million to 8 million people annually to become ill, and is responsible for 200 to 800 deaths each year."

An important discovery—the use of sodium diacetate in retarding, inhibiting and preventing the growth and development of microorganisms in foodstuffs—was patented over 50 years ago in U.S. Pat. No. 2,417,806, issued Mar. 25, 1947. However, in every case of external application of the sodium diacetate, the specification of that patent called for the use of an adhesive base, a potentially adhesive base, a colloidal or gelatinous adhesive material, an adhesive suspending medium, a gum, gelatin, a solidifying agent or the like for adhering the sodium diacetate to the meat being treated.

In 1990 a PCT application (that had been filed in Australia with Clarence J. Moye designated as the inventor and the applicant in the United States) was published under International Publication No. WO 90/3118, seeking a patent on the use of sodium diacetate sprayed or dusted—in the form of solid particles—onto the substantially dry surfaces of a meat product.

SUMMARY OF THE INVENTION

The food product of this invention comprises dressed chicken meat, either a whole dressed chicken or a dressed chicken part, which has a film or coating of sodium diacetate—either in a water solution or remaining as a solid coating after the drying of such a solution in place on the meat—that extends continuously across the external surfaces of the chicken meat and is substantially free of any adhesive material. The wet coating is retained on the external surfaces of the dressed chicken meat by the surface tension of the sodium diacetate solution after the chicken meat is coated with the solution and is hung freely to permit excess liquid to drain away. If the treated meat remains unwrapped, and the solution is permitted to dry, the sodium diacetate remains on the meat as a dry continuous coating.

In some embodiments of the product of this invention the percentage by weight of the sodium diacetate in the water solution is from about 0.02% to about 0.099% of the weight of the dry dressed chicken meat.

Preferred embodiments of the product of this invention include a removable casing positioned around the dressed chicken meat and the above mentioned coating of sodium diacetate water solution or dry coating of sodium diacetate.

As discussed below, the amount of sodium diacetate present in the product of the invention suitably depends upon the degree of pathogenic bacterial contamination of the chicken meat prior to the application of the sodium diacetate. The sodium diacetate is included in each case in sufficient quantity to preserve the meat from growth of all pathogenic bacteria of the order and species of salmonella, *E. coli,* and campylobacter.

This invention also includes the process of treating a dressed chicken part by the indicated steps, to produce a coated food product as described.

As used in this specification and the appended claims, (1) the term "chicken meat part" includes drumsticks, breasts, wings and backs, (2) the term "adhesive material" includes an adhesive base, a potentially adhesive base, a binder, an adhesive suspending medium, a gum, other adhesive colloidal material, a gelatin or the like for adhering the sodium diacetate to the meat being treated and (3) the term "casing" includes flexible wrappings.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based may readily be utilized as a basis for the designing of other products, methods and systems for carrying out the several purposes of the present invention. It is important, therefore, that the claims be regarded as including such equivalent constructions insofar as they do not depart from the spirit of the present invention.

ADVANTAGES OF THE INVENTION

The food product of this invention produces a chicken meat that is totally free of three very dangerous pathogenic bacteria species:

*salmonella enterides* and related species;

*escheritia coli* 0157/H7 and related pathogenic coliform bacteria species; and

*campylobacter jejuni* and related pathogenic species.

These are the "pathogenic bacterial species" referred to throughout this specification.

The food product of this invention is storage stable, with no reappearance of the above pathogens when the chicken meat is held under conventional refrigeration (35° to 40° F.) or frozen storage (−10° to 5° F.) in airtight packaging materials such as polystyrene trays wrapped in polyethylene film.

In addition to being free of the three above mentioned types of virulent pathogens, the food product of this invention is characterized by:

the enhancement of the growth of naturally occurring lactobacilli which are beneficial bacteria essential for the digestion of food;

the absence of any deleterious odor or taste in the meat upon preparation and cooking it for eating; and the absence of any alteration of the natural texture of the meat which would make it less attractive for eating.

The food product of this invention has several very important advantages over known dressed chicken meat products whether whole chicken or parts. Applicants have not only discovered that the sodium diacetate coating contained in the food product of their invention will adhere to the meat being treated without the use of any adhesive material, but in addition they have discovered that in the absence of adhesive material the sodium diacetate is substantially more effective in combatting and eliminating the pathogenic bacteria species in question.

These facts reduce the cost of treating the chicken meat in two significant ways. First, the amount of sodium diacetate required is markedly reduced. Second, the cost of the adhesive material is wholly eliminated. Both these cost savings are important when the margin of profit in the sale of dressed chicken meat is as low as it is.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying descriptive matter in which preferred embodiments of the invention are discussed.

Still other advantages will be apparent from the disclosure that follows.

DETAILED DESCRIPTION

In a preferred embodiment of the present invention, a food product comprising dressed chicken meat selected from the group consisting of a whole dressed chicken and dressed chicken parts; and a coating of sodium diacetate that is substantially free of an adhesive material and extends continuously along the external surfaces of the dressed chicken is provided. The diacetate coating may be (1) a coating of a water solution of sodium diacetate, or (2) a coating of sodium diacetate in solid form resulting from the drying in place of said water solution of sodium diacetate.

The external meat coating contains at least 0.02% sodium diacetate by weight of the food product. This new food product with sodium diacetate that is substantially free of an adhesive material renders the food product substantially free of pathogenic bacterial species.

In another preferred embodiment of the present invention, a food product comprises dressed chicken meat and an agent of sodium diacetate substantially free of an adhesive material combined with the dressed chicken meat. The agent contains at least 0.02% sodium diacetate by weight of the food product. Again, the food product is rendered substantially free of pathogenic bacterial species.

In yet another preferred embodiment of the present invention which renders the food product substantially free of pathogenic bacterial species, the food product comprises dressed chicken meat and an agent containing sodium diacetate. The agent being combined with the dressed chicken meat and containing about 0.02% to about 0.099% sodium diacetate by weight of the food product.

Moreover, the agent may contain about 0.02% to about 0.085%; about 0.02% to about 0.063%; about 0.04% to about 0.085%; about 0.04% to about 0.063%; or about 0.051% to about 0.085% sodium diacetate by weight of the food product.

In another series of preferred embodiments of the present invention, a food product comprises dressed chicken meat and an agent containing sodium diacetate. When the agent contains about 0.02% to about 0.04%; about 0.04% to about 0.051%; about 0.051% to about 0.063%; about 0.063% to about 0.085%; or about 0.085% to about 0.099% sodium diacetate by weight of the food product, the food product is rendered substantially free of pathogenic bacterial species.

Conventional Processing Steps

The conventional process for preparing dressed chicken meat for sale commercially includes the following steps: (1) slaughtering, defeathering, removal of head and feet; (2) eviscerating, trimming, washing and chilling; (3) packaging, storing, transporting and storing; and (4) refrigeration/freezing.

The cutting of the whole chicken into "parts" may occur either after trimming or after "storing".

Products and Process of this Invention

In the practice of the present invention, the sodium diacetate may be applied to the dressed chicken meat in a water solution before the meat is packaged, either before or after chilling.

In a preferred embodiment of the present invention, a food product comprises dressed chicken meat selected from the group consisting of i) a whole dressed chicken and ii) a dressed chicken part, and a coating of a water solution of sodium diacetate that is substantially free of any adhesive material. The coating of a water solution of sodium diacetate extends continuously across the external surfaces of the dressed chicken meat and is retained on the external surfaces because of the surface tension of the water solution. After the dressed chicken meat is coated with the solution, it is hung freely to permit excess liquid to drain away.

Preferably, the external surface of the continuous coating of a water solution of sodium diacetate is substantially smooth throughout. As will be understood, the surface tension of the water solution will tend to produce a coating having a smooth upper boundary, while irregularities and crevices on the exposed surfaces of the meat product being treated will produce a coating that has an irregular lower boundary, and as a result is not wholly uniform in thickness.

The food product of the present invention may also include a removable casing positioned around the dressed chicken meat and the coating of sodium diacetate water solution.

Moreover, the sodium diacetate of the water solution may be retained in solid form on the external surfaces after the water of the solution has evaporated. As will be seen, while this dried coating of sodium diacetate will not be uniform in thickness, it will—like the water solution from which it is derived—extend continuously across the external surfaces of the meat and in direct contact with those surfaces throughout. This food product may also include a removable casing positioned around the dressed chicken meat and the dried coating of sodium diacetate.

In the embodiments described, whether the wet or dry embodiment, the percentage by weight of sodium diacetate in the water solution involved may be from about 0.02% to about 0.099% of the weight of the food product.

Preparation of Sodium Diacetate Solution

Sodium Diacetate water solution is prepared at the desired concentration using clean, fresh water. Distilled, de-ionized or natural spring, low hardness water is preferred. For example:

| % Concentration | Sodium Diacetate | Water (ca. 10°–30° C.) |
|---|---|---|
| 20% | 20 grams | 80 ml. |
| 15% | 15 grams | 85 ml. |
| 10% | 10 grams | 90 ml. |

The sodium diacetate dissolves readily. Saturation is 40%.

The concentration selected may vary from 5% to 40% to accommodate mechanical spraying devices used to apply the sodium diacetate solution on the chicken meat. It will depend also on the degree of bacterial infection of the chicken meat due to processing and handling. The anticipated exposure to infection of the chicken meat after it is unpackaged, the length of time before cooking and other factors will be taken into account.

Application of Sodium Diacetate

The amount of sodium diacetate normally required on the chicken meat to render it totally free of pathogenic bacterial species is a practical range of 0.05% to 0.3% of the weight of the food product (i.e., chicken meat and sodium diacetate), although for greatly infected meat, a larger quantity may sometimes be required. A practical range to render the dressed chicken meat substantially free of pathogenic bacteria species is at least 0.02% of the weight of the food product.

Spraying the sodium diacetate solution onto the chicken meat is easily accomplished. Dipping the chicken meat into sodium diacetate solution is also effective and practical. Brushing the chicken meat with the sodium diacetate solution is another suitable method.

The devices that can be used to apply the sodium diacetate solution to the chicken meat include all forms of mechanical, pneumatic, electrical or hand operated equipment. Included are those which through introduction of an electrical current charge and/or ionize the Sodium Diacetate solution before or during the spraying action. Whatever mechanical, pneumatic or electrical spraying device is used, it is very important that it deliver a uniform mist of droplets, which will establish a uniform film of sodium diacetate solution on all surfaces of the chicken, with attention paid to the exposed cavity surfaces of the whole chicken.

The sodium diacetate may also be applied by dipping the whole chicken meat or parts into a 5%–35% water solution of sodiun diacetate. The dwell-time in the solution will be determined by the factors of degree of infection, whether the whole chicken or chicken parts are being treated, and the condition of the processing operation equipment.

Another method is to brush the solution onto the chicken meat surfaces by hand or mechanically. Or a combination of the above methods may be used.

The sprayed, dipped or brushed chicken meat is allowed to hang freely to permit excess liquid to drain away. A hooded conveyor within which the air is controlled to prevent reinfection of the chicken meat is ideal.

As will be recognized, as a result of the steps described a film or coating of sodium diacetate water solution is retained on the external surfaces of the whole dressed chicken, or chicken part, because of the surface tension of the solution. The amount of sodium diacetate solution remaining on a given dressed chicken meat, after such draining is continued until the solution stops dripping off the meat, will be substantially the same regardless of the amount of sodium diacetate contained in this solution, or in other words, regardless of what the concentration of the solution is. As will be further understood, the thickness of the layer of sodium diacetate solution will be substantially the same throughout the meat surfaces.

Subtracting the dry (pre-application) weight of the dressed whole chicken or chicken part (as the case may be) from the weight of the wet chicken meat will give the weight of the sodium diacetate solution that coats the dressed chicken or the dressed chicken part. Multiplying this weight of retained water solution by the predetermined percentage weight of sodium diacetate will in each case give the weight of sodium diacetate retained on the dressed chicken meat. This can then be expressed as a percentage of the weight of the wet meat.

Packaging

A wide variety of choices exists. A styrofoam tray with an overwrap of polyethylene film is standard. The chicken meat is to be wet when wrapped.

A series of tests were made to show the extent to which various concentrations of sodium diacetate water solutions that are substantially free of adhesive material will inhibit the growth of salmonella, $E.coli$ and campylobacter on dressed whole chicken or dressed chicken parts.

EXAMPLE 1

Tests made using plate culture media favorable to the growth of salmonella (enterides), and $E.$ $coli$ (H0157) clearly indicated that a water solution of sodium diacetate stops the growth of those bacteria when sufficient quantities of sodium diacetate are included in the medium.

In a zone of inhibition test, a drop of sodium diacetate water solution was placed on agar plate media previously inoculated with $E.$ $coli$ and salmonella, respectively. The plates were incubated for 24–48 hours. The zones of inhibition (minimum diameter of the colony) of the respective bacteria were measured. The larger the diameter as thus measured, the greater the degree of inhibition of the colony of the bacteria. The data from these tests are set forth below.

| Concentration of sodium diacetate | Diameter of zone of inhibition for $E.$ $coli$ (in mm.) | Diameter of zone of inhibition for salmonella (in mm.) |
|---|---|---|
| Negative control | 0 | 0 |
| 20% | 20 | 22 |
| 10% | 16 | 19 |
| 5% | 12 | 15 |
| 2.5% | 0 | 10 |
| 2.0% | 0 | 10 |
| 1.5% | 0 | 0 |
| .75% | 0 | 0 |
| .50% | 0 | 0 |
| .25% | 0 | 0 |
| Positive control | 20 | 24 |

EXAMPLE 2

This test shows that a water solution of sodium diacetate inhibits the growth of pathogenic bacteria on skinless chicken parts.

A quantity of chicken parts (drumsticks, skin removed) was inoculated with salmonella enterides bacteria, simulating a commercial situation. The surface of the chicken meat was then sprayed, using a hand operated spray bottle, with 20% sodium diacetate water solution. The chicken was then packaged in a polyethylene bag and incubated at 4° C. Samples were removed initially and at 30 minutes, and 24, 72 and 120 hours. These were then tested for number of salmonella present. (Laboratory method per Association of Agricultural Chemists.) Similar tests were made inoculating the chicken with *E. coli* H0157 and *campylobacter jejuni*. With each of the species, a control sample that was given no treatment was included.

In this Example 2 and in Examples 3–5, 8 and 9 below, the results of the tests are expressed in terms of the number of bacteria cells per gram of chicken meat.

In this Example 2, sodium diacetate treatment reduced the bacteria numbers to zero in 72 hours. Bacteria numbers in untreated chickens rose to 700,000/gram.

Chicken drumsticks held at 4° C.

| Test No. | | Initial | 30 Min. | 24 Hrs. | 72 Hrs. |
|---|---|---|---|---|---|
| 4 | Surface inoculated with salmonella, then sprayed with 20% solution of sodium diacetate. | 140 | 230 | 20 | 0 |
| 3 | Surface inoculated with salmonella. No sodium diacetate applied. | 260 | 320 | 390 | 120,000 |
| 2 | Surface inoculated with *E. coli* then sprayed with 20% solution of sodium diacetate | 180 | 30 | 10 | 0 |
| 1 | Surface inoculated with *E. coli*. No sodium diacetate applied. | 190 | 600 | 1400 | 700,000 |
| 6 | Surface inoculated with campylobacter, then sprayed with 20% solution of sodium diacetate | 220 | 130 | 0 | 0 |
| 5 | Surface inoculated with campylobacter. No sodium diacetate applied. | 160 | 130 | 0 | 0 |

*E. coli* isolate - *E. coli* 0157-H7
Salmonella - *Salmonella enteritidis*
Campylobacter - *Campylobacter jejuni*

EXAMPLE 3

This is a repeat test of Example 2, and shows that sodium diacetate inhibits pathogen bacteria on skinless chicken meat.

| Test No. | | Initial | 30 Min. | 24 Hrs. | 72 Hrs. |
|---|---|---|---|---|---|
| 4A | Surface inoculated with salmonella then sprayed with 20% solution of sodium diacetate. | 250 | 30 | 0 | 0 |
| 3A | Surface inoculated with salmonella. No sodium diacetate applied. | 410 | 1200 | 16,000 | 200,000 |
| 2A | Surface inoculated with *E. coli*, then sprayed with 20% solution of sodium diacetate. | 140 | 40 | 0 | 0 |
| 1A | Surface inoculated with *E. coli*. No sodium diacetate applied. | 120 | 1800 | 2800 | 400,000 |
| 6A | Surface inoculated with campylobacter, then sprayed with 20% solution of sodium diacetate. | 110 | 30 | 0 | 0 |
| 5A | Surface inoculated with campylobacter. No sodium diacetate applied. | 130 | 80 | 0 | 0 |

The data for this example 3 show again that sodium diacetate treatment of skinless chicken meat that has been deliberately exposed to (inoculated with) three pathogen bacteria quickly reduces the latter to zero numbers.

EXAMPLE 4

This Example 4 shows that sodium diacetate inhibits pathogens on chicken, with skin held at 4° C.

| Test No. | | Initial | 30 Min. | 24 Hrs. | 72 Hrs. |
|---|---|---|---|---|---|
| 10 | Surface inoculated with salmonella, then sprayed with 20% solution of sodium diacetate. | 700 | 40 | 10 | 0 |
| 9 | Surface inoculated with salmonella. No sodium diacetate applied. | 560 | 1800 | 2800 | 3000 |
| 8 | Surface inoculated with *E. coli*, then sprayed with 20% solution of sodium diacetate. | 460 | 80 | 10 | 0 |
| 7 | Surface inoculated with *E. coli*. No sodium diacetate applied. | 520 | 960 | 1400 | 3000 |
| 12 | Surface inoculated with campylobacter, then sprayed with 20% solution of sodium diacetate | 210 | 60 | 0 | 0 |
| 11 | Surface inoculated with campylobacter. No sodium diacetate applied. | 160 | 40 | 0 | 0 |

EXAMPLE 5

Skinless chicken - 5%, 10%, 20% sodium diacetate water solutions

| Bacteria Inoculation | Sodium Diacetate Solution* | Colonies per Gram | | |
|---|---|---|---|---|
| | | Initial | 24 Hrs. | 72 Hrs. |
| Salmonella | 0% | 220 | 1,200 | 40,000 |
| " | 5 | 280 | 60 | 220 |
| " | 10 | 130 | 40 | 280 |
| " | 20 | 180 | 10 | 0 |
| *E. coli* | 0 | 210 | 1,600 | 150,000 |
| " | 5 | 260 | 260 | 780 |
| " | 10 | 120 | 100 | 430 |
| " | 20 | 180 | 0 | 0 |

-continued

Skinless chicken - 5%, 10%, 20% sodium diacetate water solutions

| Bacteria | Sodium Diacetate | Colonies per Gram | | |
|---|---|---|---|---|
| Inoculation | Solution* | Initial | 24 Hrs. | 72 Hrs. |
| Campylobacter | 0 | 230 | 70 | 0 |
| " | 5 | 250 | 30 | 0 |
| " | 10 | 270 | 10 | 0 |
| " | 20 | 190 | 0 | 0 |

*Concentration

Summary of Examples 2–5

Sodium dicetater solution, sprayed onto chicken meat, with or with skins, firmly controls three pathogen bacteria species. The range of control is 5% sodium diacetate water solution for simulated commercial infection of mild degree to 20% sodium diacetate water solution for major infection (beyond the probability of occurrence with reasonably good processing practice).

EXAMPLE 6

The data in Examples 1–5 demonstrate that sodium diacetate is an effective agent in eliminating three pathogenic bacteria genera on chicken meat by spraying sodium diacetate solution onto the meat, or by immersing the chicken meat in the sodium diacetate solution. Determination was made of the percent of weight of sodium diacetate deposited on the chicken when a range of sodium diacetate water solutions was employed. As one example:

| | |
|---|---|
| Weight of chicken after spraying 20% sodium diacetate solution | 1,341.6 gm. |
| Weight before spraying | 1,335.9 gm. |
| Weight of retained sodium diacetate solution | 5.75 gm. |
| 20% sodium diacetate | 1.14 gm. |
| Percent sodium diacetate on chicken | 0.085% |

The table just below sets forth the results of the other percentage concentrations of sodium diacetate water solution used in these calculations.

Percent Sodium Diacetate Deposited on Chicken Meat

| Water Solution - Percent Sodium Diacetate | Method | Amount of Sodium Diacetate Deposited on Chicken Meat |
|---|---|---|
| 23.0% | Spraying | 0.099% |
| 20.0% | " | 0.085% |
| 15.0% | " | 0.063% |
| 12% | " | 0.051% |
| 10% | " | 0.04% |
| 5% | " | 0.02% |
| 12% | Immersing | 0.099% |
| 10% | " | 0.04% |
| 5% | " | 0.02% |

EXAMPLE 7

A simple test was set up to establish the effect, if any, of an extended treatment of sodium diacetate on the taste, odor, texture, and moisture of fresh chicken. The test was set up to simulate cooling a freshly dressed chicken in an ice water bath (chilling tank), which is a common practice in poultry processing. It should be noted that the dwell in this test is considered to be excessive of the time necessary to adequately control bacterial growth.

A fresh, whole chicken carcass was placed in a stainless steel container containing a 20% solution of sodium diacetate (2 pounds), water (6 pounds) and ice (2 pounds). The solution temperature prior to adding the test bird was noted at 35.5° F.

The bird was submersed in the bath for a total of 30 minutes, during which time it was turned every 7.5 minutes to insure equal interior and exterior surface exposure. After 30 minutes, the bird was removed from the solution, hung to drip for 5 minutes, and placed into an airtight bag for refrigerated storage at 38° F. for 48 hours.

After 48 hours had elapsed, the bird was removed from the bag, cut into pieces, and rinsed with cool water (normal preparation for frying). The pieces were then dipped in egg, rolled in a mixture of one-half flour and one-half Golden Dipt Chicken Fry Mix, and placed in an electric frying pan with vegetable oil at 350° F.

After preparation, the hot fried chicken was tasted by a panel of six people. Other than the operator of that test and his wife, no one was aware of the sodium diacetate treatment prior to preparation. Everyone tasting was familiar with the recipe used. A unanimous consensus of all six "tasters" found the chickens' flavor, texture, moisture, and aroma to be very good.

The remaining pieces were then refrigerated for 12 hours and tasted cold. The results were the same, with all panel members finding flavor, texture, moisture and aroma very good.

The conclusion of this test indicates that an extended treatment of chicken with sodium diacetate has no affect on flavor, texture, moisture or aroma.

EXAMPLE 8

Sodium diacetate is selective, inhibiting pathogenic coliform bacteria, but encouraging harmless and beneficial bacteria species. The latter are lactobacilli which are commonly found in vegetables, meat and fruit. These species produce lactic acid and acetic acid, which combined are milk preservatives effective against mold organisms and mildly so against some bacteria species. The data in Table 8 demonstrate this.

Skinless chicken drumsticks (obtained at a local supermarket) were inoculated with chicken feces to assure presence of pathogens. Sodium diacetate in water solution was then sprayed onto the skinless chicken parts, which were then held at 4° C. and tested for bacteria per gram at intervals of 24 and 48 hours, with the following results:

| | 24 Hours | | 48 Hours | |
|---|---|---|---|---|
| Reagent | Coliforms | Lactobacilli | Coliforms | Lactobacilli |
| % Sodium diacetate | 30 | 700 | 30 | 40 |
| 5% Sodium diaceate water solution | 20 | 900 | 10 | 10 |
| 10% | 0 | 1100 | 0 | 90 |
| 20% | 0 | 900 | 0 | 950 |

These data indicate again the selectivity of the bacteriostatic action of sodium diacetate on micro-organisms commonly found on chicken presented for commercial sale.

Coliforms (pathogens) were eliminated in 24 hours in sodium diacetate treated chickens. Conversely, lactobacilli growth was enhanced by 10% and 20% sodium diacetate solution sprayed on the chicken.

EXAMPLE 9

This example shows the comparative efficacy of various methods of applying sodium diacetate water solution to skinless chicken drumsticks, expressed in terms of bacteria per grams of meat after storage at 4° C.

| Method | 24 Hrs. | | | 96 Hrs. | | |
|---|---|---|---|---|---|---|
| | Salmonella | E. coli 0157 | Campylobacter | Salmonella | E. coli 0157 | Campylobacter |
| 1. Control - No Sodium Diacetate | 300 | 700 | 700 | 700 | 2800 | 0 |
| 1A. Control - No Sodium Diacetate | 390 | 1400 | 130 | 120,000 | 700,000 | 90 |
| 2. Sprayed 20% SDA | 20 | 10 | 0 | 0 | 0 | 0 |
| 3. Immersed 20% SDA | 0 | 70 | 0 | 0 | 180 | 0 |
| 4. Immersed 30% SDA | 10 | 10 | 0 | 0 | 0 | 0 |
| 5. Brushed 20% SDA | 0 | 50 | 0 | 0 | 0 | 0 |
| 6. Brushed 30% SDA | 0 | 20 | 0 | 0 | 90 | 0 |
| 7. Dusted 0.2% Dry SDA | 200 | 500 | 0 | 0 | 190 | 0 |

The data of Example 9 indicate that the sodium diacetate may be applied to the chicken meat by spraying a solution of sodium diacetate, or by immersing the meat in a solution of sodium diacetate, or by brushing the solution of sodium diacetate on the meat. It might be expected that immersing the meat in a solution of sodium diacetate would give the best coverage. Clearly, however, spraying a solution of sodium diacetate is most efficacious to forestall growth of these three pathogen bacteria species, and thus would be the lower cost method if used in a commercial application of this invention.

While this invention has been described in connection with the best mode presently contemplated by the inventor for carrying out his invention, the preferred embodiments described are for purposes of illustration only, and are not to be construed as constituting any limitations of the invention. Modifications will be obvious to those skilled in the art, and all modifications that do not depart from the spirit of the invention are intended to be included within the scope of the appended claims.

We claim:

1. A food product which comprises:
   a. dressed chicken meat selected from the group consisting of i) a whole dressed chicken and ii) a dressed chicken part; and
   b. a coating of a water solution of sodium diacetate that i) extends continuously across the external surfaces of said dressed chicken meat, ii) is retained on said external surfaces, because of the surface tension of said water solution, after said dressed chicken meat is coated with said solution and is hung freely to permit excess liquid to drain away, and iii) is substantially free of any adhesive material.

2. The food product of claim 1 in which the external surface of said coating of a water solution of sodium diacetate is substantially smooth throughout.

3. The food product of claim 1 in which the sodium diacetate of said water solution is retained in solid form as a continuous coating on the external surfaces of said dressed chicken meat after the water of said solution has evaporated.

4. The food product of claim 3 which includes a removable casing positioned around said dressed chicken and said coating of sodium diacetate, said casing being installed in said position after substantially all said liquid has been permitted to evaporate.

5. The food product of claim 1 which includes a removable casing positioned around said dressed chicken meat and said coating of the water solution of sodium diacetate, said casing being installed in said position after said dressed chicken meat has been coated with said water solution and said excess liquid has been permitted to drain away.

6. The food product of claim 1 in which the percentage by weight of sodium diacetate in said water solution is from about 0.02% to about 0.099% of the weight of said food product.

7. The method of producing a food product which comprises:
   (a) applying to a dressed chicken meat, selected from the group consisting of a whole dressed chicken and a dressed chicken part, a water solution of sodium diacetate to produce a coating of said water solution that extends continuously across the external surfaces of said dressed chicken meat, said water solution of sodium diacetate being substantially free of any adhesive material; and
   (b) thereafter hanging said chicken meat freely to permit excess liquid to drain away.

8. The method of claim 7 in which the external surface of said coating of the water solution of sodium diacetate is substantially smooth throughout.

9. The method of claim 7 in which said dressed chicken part coated with a water solution of sodium diacetate is permitted to dry out until substantially all the water in said solution of sodium diacetate has evaporated and the sodium diacetate is retained in dry solid form as a continuous coating on the external surfaces of said dressed chicken meat.

10. The method of claim 9 in which a removable casing is positioned around said dressed chicken meat after substantially all the water in said coating of a water solution of sodium diacetate has been permitted to evaporate.

11. The method of claim 9 in which the percentage by weight of sodium diacetate in said water solution, from which said solid coating of sodium diacetate is derived, is from about 0.02% to about 0.099% of the weight of said food product.

12. The method of claim 7 in which, after said dressed chicken meat has been coated with a water solution of sodium diacetate, a removable casing is positioned around said treated chicken meat.

13. The method of claim 7 in which the percentage by weight of sodium diacetate in said water solution is from about 0.02% to about 0.099% of the weight of said food product.

* * * * *